(12) United States Patent
Rojas

(10) Patent No.: US 7,841,028 B1
(45) Date of Patent: Nov. 30, 2010

(54) TOILET MOVING DEVICE

(76) Inventor: Arnold C. Rojas, 6850 S. Missiondale Rd., Tucson, AZ (US) 85706

( * ) Notice: Subject to any disclaimer, the term of this patent is extended or adjusted under 35 U.S.C. 154(b) by 1190 days.

(21) Appl. No.: 11/427,018

(22) Filed: Jun. 28, 2006

(51) Int. Cl.
*A47K 17/00* (2006.01)

(52) U.S. Cl. ............... 4/661; 280/47.24; 280/47.28; 280/47.29

(58) Field of Classification Search ............... 4/661; 414/451; 280/47.17, 47.19, 47.24, 47.27–47.29, 280/47.34
See application file for complete search history.

(56) References Cited

U.S. PATENT DOCUMENTS

| | | | |
|---|---|---|---|
| 2,795,433 A | * | 6/1957 | Moriarty ................. 280/47.28 |
| 3,391,905 A | | 7/1968 | Burns |
| 3,868,033 A | * | 2/1975 | Le Duff ................. 414/648 |
| 4,722,511 A | | 2/1988 | Chitwood |
| 5,203,065 A | | 4/1993 | Peters |
| 5,373,593 A | * | 12/1994 | Decky et al. ............. 4/661 |
| 5,556,076 A | | 9/1996 | Jacquay |
| 5,716,183 A | | 2/1998 | Gibson et al. |
| D406,683 S | | 3/1999 | Taylor et al. |
| 6,135,466 A | * | 10/2000 | Irwin ................. 280/47.28 |

* cited by examiner

*Primary Examiner*—Tuan N Nguyen

(57) ABSTRACT

A toilet moving device for facilitating lifting and transporting of a toilet includes a dolly being insertable under a front of a pedestal of the toilet to facilitate lifting of the toilet. A base is coupled to the dolly. A lifting assembly is coupled to the base. The lifting assembly engages a tank of the toilet. The lifting assembly supports the toilet when the dolly is used to lift the toilet.

10 Claims, 4 Drawing Sheets

TOILET MOVING DEVICE

BACKGROUND OF THE INVENTION

1. Field of the Invention

The present invention relates to toilet lifting devices and more particularly pertains to a new toilet lifting device for facilitating the lifting and transportation of a toilet.

2. Description of the Prior Art

The use of toilet lifting devices is known in the prior art. The prior art commonly teaches devices for engaging a back of a pedestal of a toilet to lift the toilet and then the toilet is secured to the device for transportation.

While these devices fulfill their respective, particular objectives and requirements, the need remains for a device that has certain improved features that allow a toilet to be picked up and support with the same motion. Additionally, the device can be adjusted to accommodate toilets of varying heights.

SUMMARY OF THE INVENTION

The present invention meets the needs presented above by generally comprising a dolly being insertable under a front of a pedestal of the toilet to facilitate lifting of the toilet. A base is coupled to the dolly. A lifting assembly is coupled to the base. The lifting assembly engages a tank of the toilet. The lifting assembly supports the toilet when the dolly is used to lift the toilet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
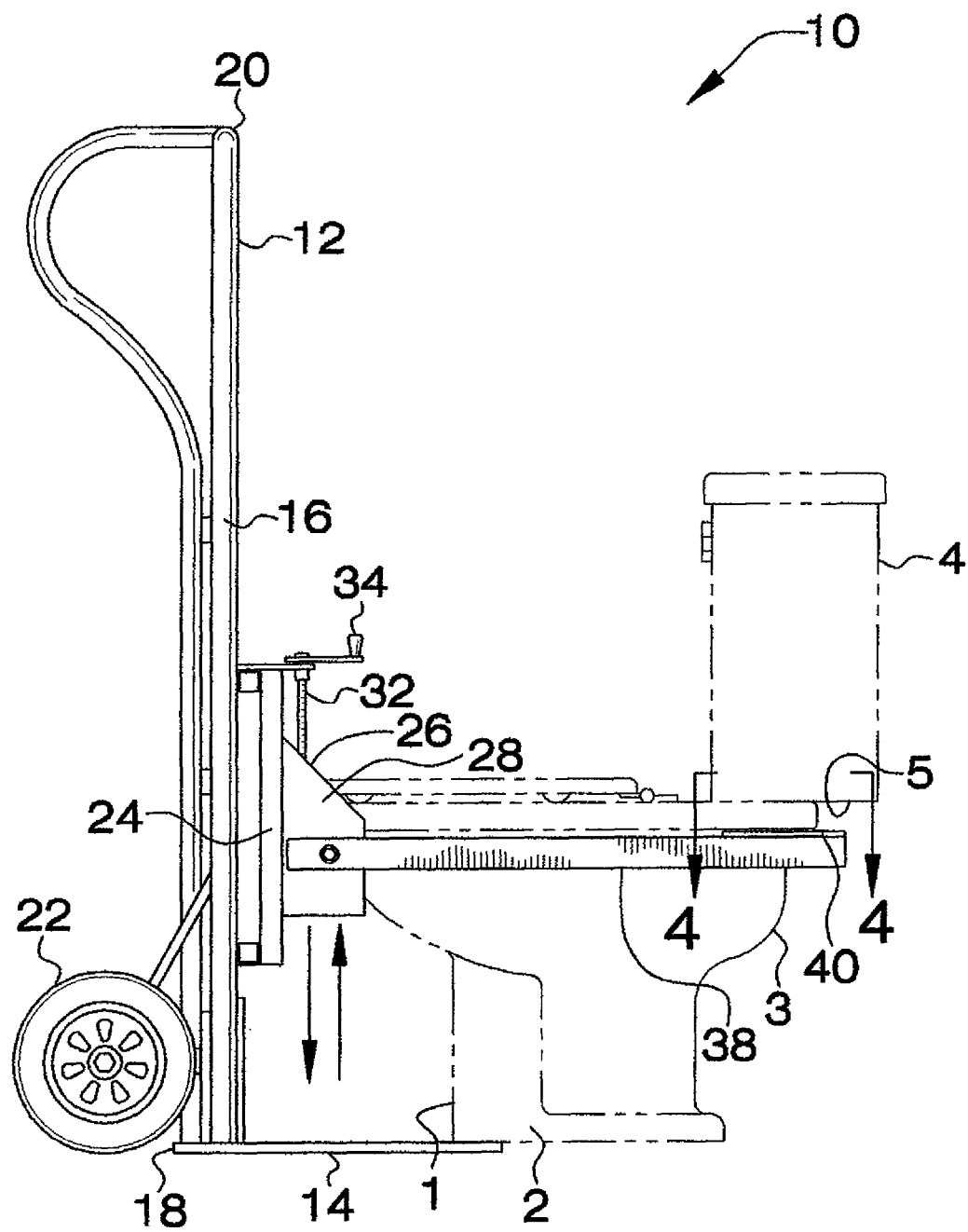
FIG. 1 is a side view of a toilet moving device according to the present invention shown in use.
Figure 2:
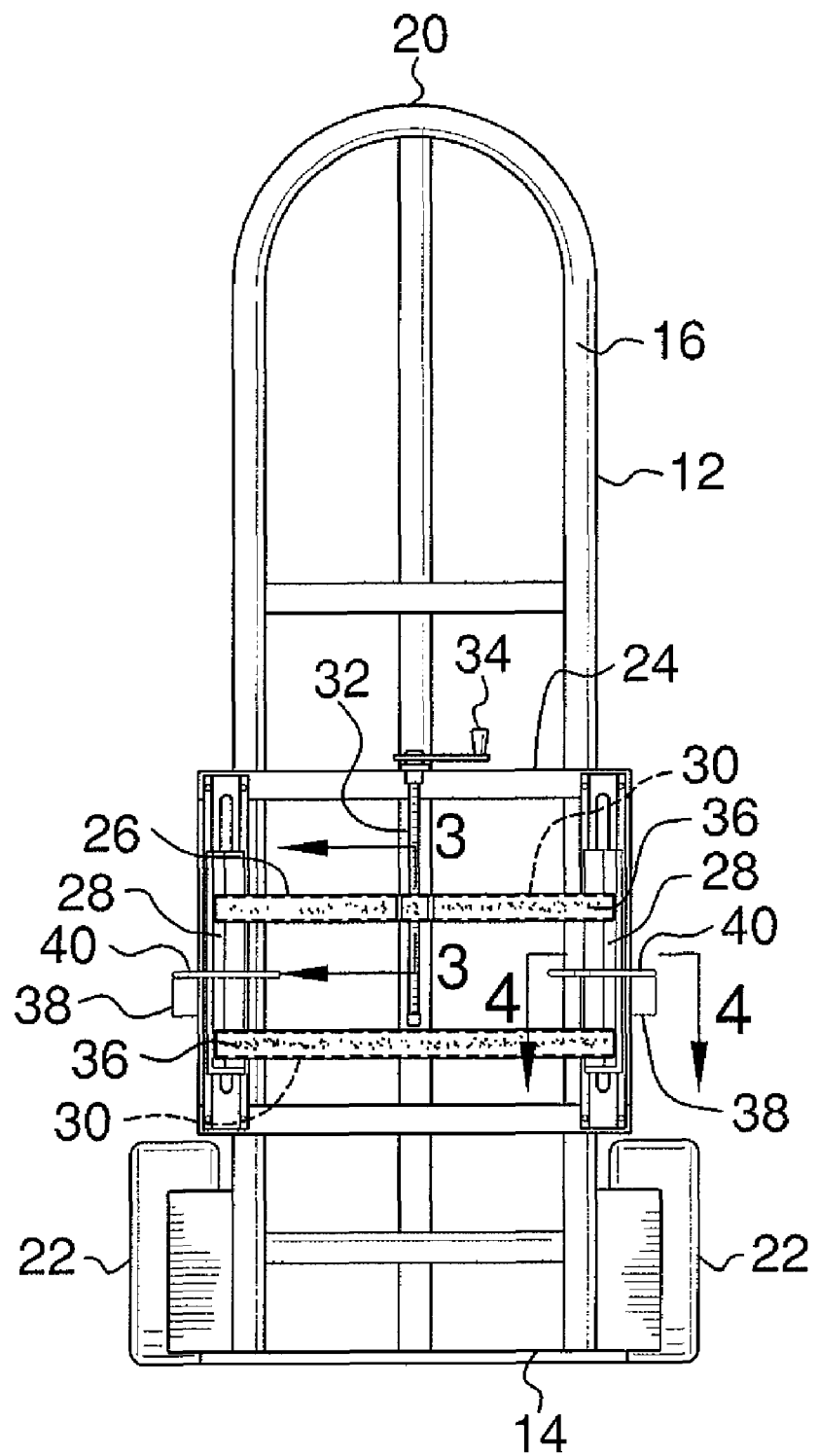
FIG. 2 is a front view of the present invention.
Figure 3:
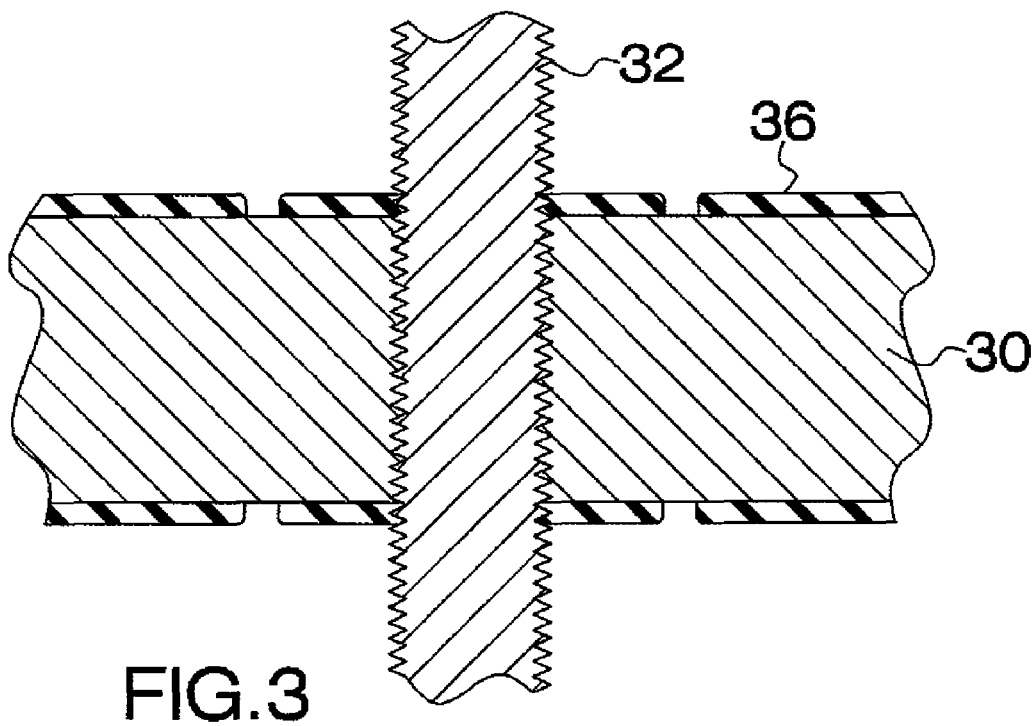
FIG. 3 is a cross-sectional view of the present invention taken along line 3-3 of FIG. 2.
Figure 4:
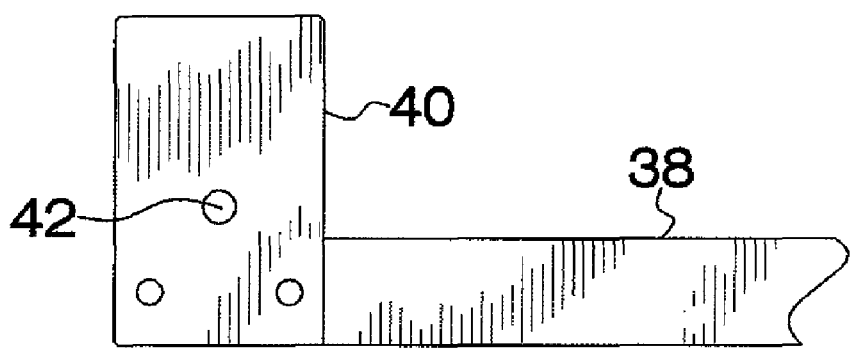
FIG. 4 is a top view of one of the lifting plates of the present invention taken along line 4-4 of FIG. 1.
Figure 5:
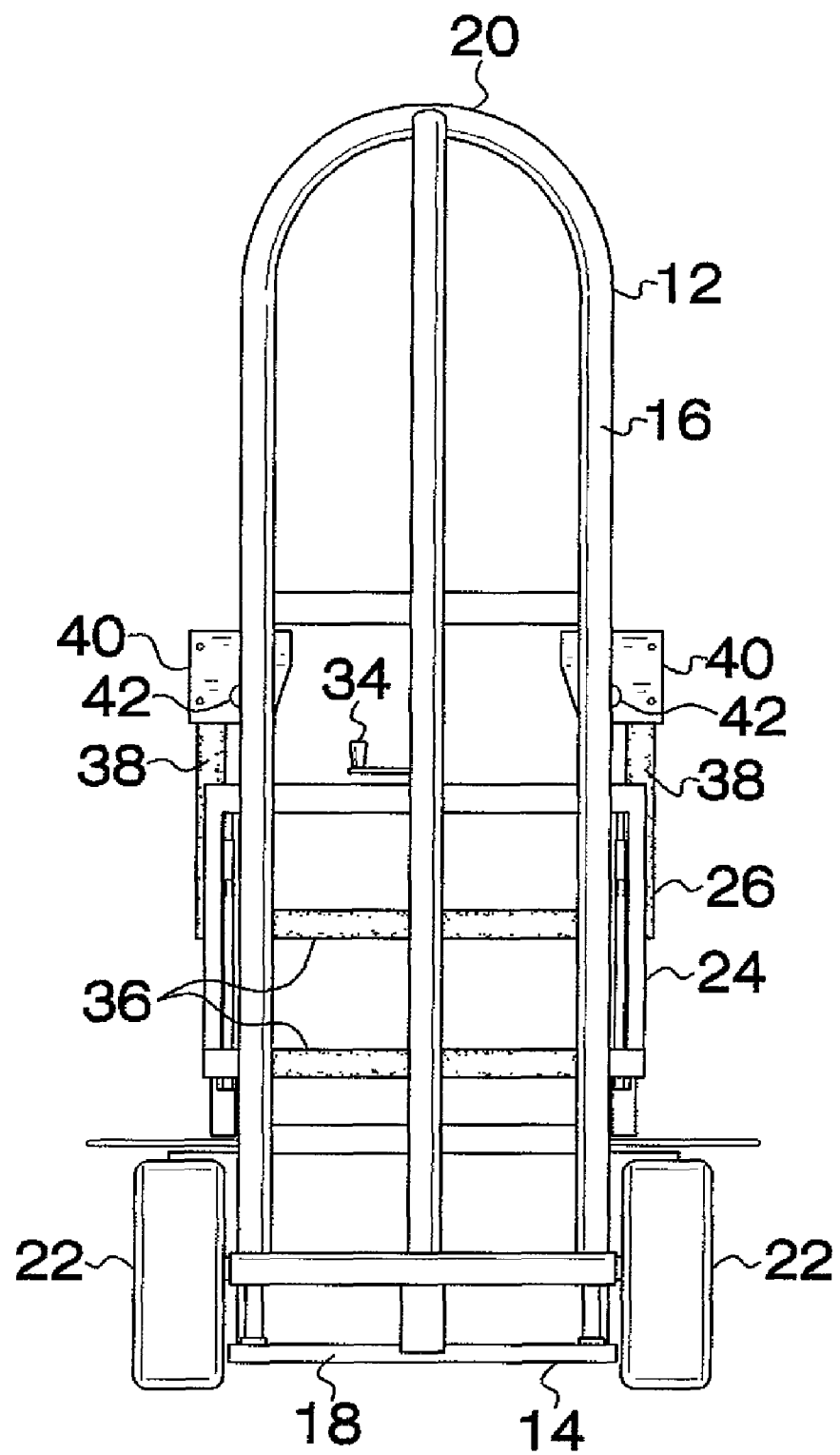
FIG. 5 is a rear view of the present invention with the arms in the stored position.

With reference now to the drawings, and in particular to FIGS. 1 through 5 thereof, a new toilet lifting device embodying the principles and concepts of the present invention and generally designated by the reference numeral 10 will be described.

As best illustrated in FIGS. 1 through 5, the toilet moving device 10 generally comprises a dolly 12 being insertable under a front 1 of a pedestal 2 of a toilet 3 to facilitate lifting of the toilet 3. The dolly 12 includes a tongue 14 insertable under the front 1 of the pedestal 2 of the toilet 3. A frame 16 is coupled to and upwardly extending from the tongue 14. The frame 16 is positioned adjacent a rear edge 18 of the tongue 14. A top end 20 of the frame 16 is graspable to permit tipping of the tongue 14 to lift the pedestal 2 of the toilet 3 off a support surface. Each of a plurality wheels 22 is rotatably coupled to the frame 16. Each of the wheels 22 is positioned opposite the tongue 14 with respect to the frame 16. The wheels 22 facilitate transportation of the frame 16, the tongue 14 and the toilet 3 across the support surface when the frame 16 is tipped to lift the toilet 3 off the support surface.

A base 24 is coupled to the dolly 12. The base 24 is positioned above the tongue 14. A lifting assembly 26 is coupled to the base 24. The lifting assembly 26 engages a tank 4 of the toilet 3. The lifting assembly 26 supports the toilet 3 when the dolly 12 is used to lift the toilet 3. The lifting assembly 26 includes a pair of support plates 28. Each of the support plates 28 is slidably coupled to opposite sides of the base 24. Each of the support plates 28 is vertically adjustable to adjust a height of the support plates 28 with respect to the tongue 14.

At least one bracing rod 30 is coupled to and extends between the support plates 28. The bracing rod 30 aligns the support plates 28 and permits the support plates 28 to be moved in unison. A crank 32 is rotatably coupled to the base 24. The crank 32 threadably engages the at least one bracing rod 30. The crank 32 is rotated to adjust a height of the bracing rod 30 above the tongue 14 and thereby the height of the support plates 28 above the support surface. A handle 34 is coupled to the crank 32 opposite the at least one bracing rod 30.

At least one protective cover 36 is coupled to the at least one bracing rod 30. The at least one protective cover 36 is comprised of a resiliently compressible material to inhibit damage to the toilet 3 when the toilet 3 contacts the at least one bracing rod 30. Each of a pair of arms 38 is pivotally coupled to one of the support plates 28. Each of the arms 38 is pivoted between a stored position and a deployed position. The stored position is defined as the arms 38 extending vertically from the support plates 28. The deployed position is defined as the arms 38 extending horizontally from the support plates 28. The arms 38 extend along opposing sides of the toilet 3 when the arms 38 are in the deployed position.

Each of a pair of lifting plates 40 is coupled to one of the arms 38 opposite the associated one of the support plates 28. Each of the lifting plates 40 engages a bottom face 5 of the tank 4 to support the toilet 3 when the dolly 12 lifts the toilet 3. At least one of the lifting plates 40 has an intake aperture 42 extending therethrough. The intake aperture 42 receives a water inlet extending from the bottom surface of the tank 4 to permit the associated one of the lifting plates 40 to engage the bottom surface of the tank 4.

In use, the arms 38 are pivoted to deployed positioned and the lifting plates 40 are positioned under the tank 4. The tongue 14 of the dolly 12 is inserted under the front 1 of the pedestal 2 of the toilet 3. As the frame 16 is tipped the tongue 14 pushes the pedestal 2 upward and the lifting plates 40 support the tank 4 to lift the toilet 3 off the support surface and facilitate transportation of the toilet 3 to a desired location.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A toilet moving device configured to support and aiding a person in transporting a toilet, said device comprising:
  a dolly being insertable under a front of a pedestal of the toilet to facilitate lifting of the toilet;
  a base being coupled to said dolly; and
  a lifting assembly being coupled to said base, said lifting assembly being engageable with the toilet to support the toilet when the dolly is used to lift the toilet, said lifting assembly including;
    a pair of support plates, each of said support plates being slidably coupled to opposite sides of said base, each of said support plates being vertically adjustable to adjust a height of said support plates with respect to a tongue of said dolly;
    a pair of arms, each of said arms being pivotally coupled to one of said support plates, each of said arms being pivoted between a stored position and a deployed position, said stored position being defined as said arms extending vertically from said support plates, said deployed position being defined as said arms extending horizontally from said support plates, said arms extending along opposing sides of the toilet when said arms in the deployed position;
    a pair of lifting plates, each of said lifting plates being coupled to one of said arms opposite the associated one of said support plates, each of said lifting plates engaging a bottom face of the tank to support the toilet when the toilet is lifted by said dolly, at least one of said lifting plates having an intake aperture extending therethrough, said intake as aperture receiving a water inlet extending from the bottom surface of the tank to permit the associated one of said lifting plates to engage the bottom surface of the tank.

2. The device according to claim 1, wherein said dolly includes a tongue being insertable under the front of the pedestal of the toilet, said base being positioned above said tongue.

3. The device according to claim 2, wherein said dolly includes a frame being coupled to and upwardly extending from said tongue, a top end of said frame being graspable to permit tipping of said tongue to lift the pedestal of the toilet off a support surface.

4. The device according to claim 3, wherein said frame is positioned adjacent a rear edge of said tongue.

5. The device according to claim 3, wherein said dolly includes a plurality of wheels, each of said wheels being rotatably coupled to said frame, each of said wheels being positioned opposite said tongue with respect to said frame, said wheels facilitating transportation of said frame, tongue and the toilet across the support surface when said frame is tipped to lift the toilet off the support surface.

6. The device according to claim 1, wherein said lifting assembly includes at least one bracing rod being coupled to and extending between said support plates, said bracing rod aligning said support plates and permitting said support plates to be moved in unison.

7. The device according to claim 6, wherein said lifting assembly includes a crank being rotatably coupled to said base, said crank threadably engaging said at least one bracing rod, said crank being rotated to adjust a height of said bracing rod above said tongue and thereby the height of said support plates above the support surface.

8. The device according to claim 7, wherein said lifting assembly includes a handle being coupled to said crank opposite said at least one bracing rod.

9. The device according to claim 6, wherein said lifting assembly includes at least one protective cover being coupled to said at least one bracing rod, said at least one protective cover being comprised of a resiliently compressible material to inhibit damage to the toilet when the toilet contacts said at least one bracing rod.

10. A toilet moving device configured to support and aiding a person in transporting a toilet, said device comprising:
  a dolly being insertable under a front of a pedestal of the toilet to facilitate lifting of the toilet, said dolly comprising;
    a tongue being insertable under the front of the pedestal of the toilet;
    a frame being coupled to and upwardly extending from said tongue, said frame being positioned adjacent a rear edge of said tongue, a top end of said frame being graspable to permit tipping of said tongue to lift the pedestal of the toilet off a support surface;
    a plurality of wheels, each of said wheels being rotatably coupled to said frame, each of said wheels being positioned opposite said tongue with respect to said frame, said wheels facilitating transportation of said frame, said tongue and the toilet across the support surface when said frame is tipped to lift the toilet off the support surface;
  a base being coupled to said dolly, said base being positioned above said tongue;
  a lifting assembly being coupled to said base, said lifting assembly being engageable with the toilet to support the toilet when the dolly is used to lift the toilet;
    a pair of support plates, each of said support plates being slidably coupled to opposite sides of said base, each of said support plates being vertically adjustable to adjust a height of said support plates with respect to said tongue;
    at least one bracing rod being coupled to and extending between said support plates, said bracing rod aligning said support plates and permitting said support plates to be moved in unison;
    a crank being rotatably coupled to said base, said crank threadably engaging said at least one bracing rod, said crank being rotated to adjust a height of said bracing rod above said tongue and thereby the height of said support plates above the support surface;
    a handle being coupled to said crank opposite said at least one bracing rod;
    at least one protective cover being coupled to said at least one bracing rod, said at least one protective cover being comprised of a resiliently compressible material to inhibit damage to the toilet when the toilet contacts said at least one bracing rod;
    a pair of arms, each of said arms being pivotally coupled to one of said support plates, each of said arms being pivoted between a stored position and a deployed position, said stored position being defined as said arms extending vertically from said support plates, said deployed position being defined as said arms extending horizontally from said support plates, said arms extending along opposing sides of the toilet when said arms in the deployed position; and a pair of lifting plates, each of said lifting plates being coupled to one of said arms opposite the associated one of said support plates, each of said lifting plates engaging a bottom face of the tank to support the toilet when the toilet is lifted by said dolly, at least one of said lifting plates having an intake aperture extending therethrough, said intake aperture receiving a water inlet extending from the bottom surface of the tank to permit the associated one of said lifting plates to engage the bottom surface of the tank.

\* \* \* \* \*